No. 704,445. Patented July 8, 1902.
J. M. DUNAHOO.
ENDLESS CHAIN REEL.
(Application filed June 8, 1901.)
(No Model.)
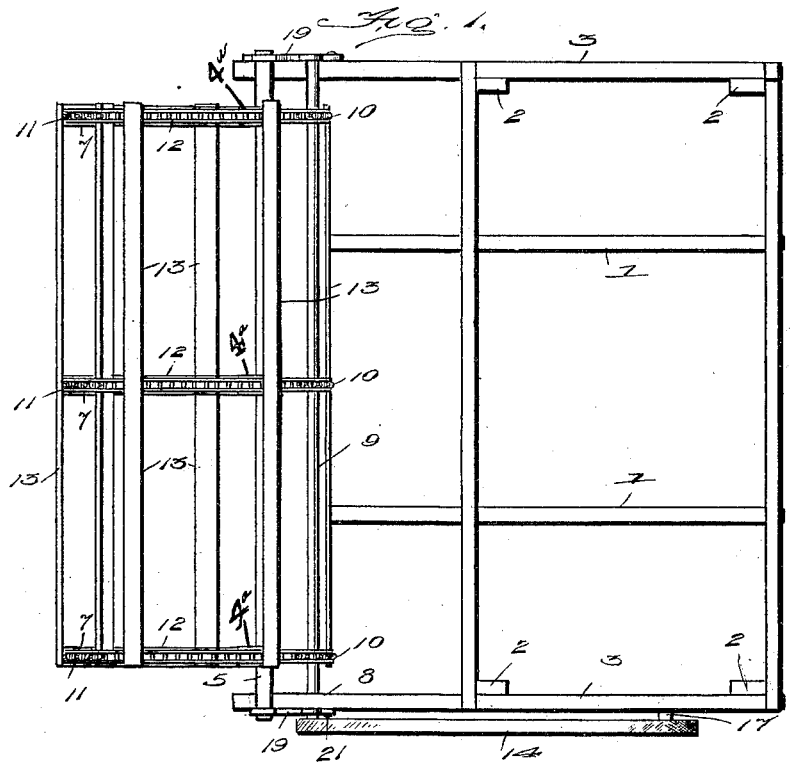
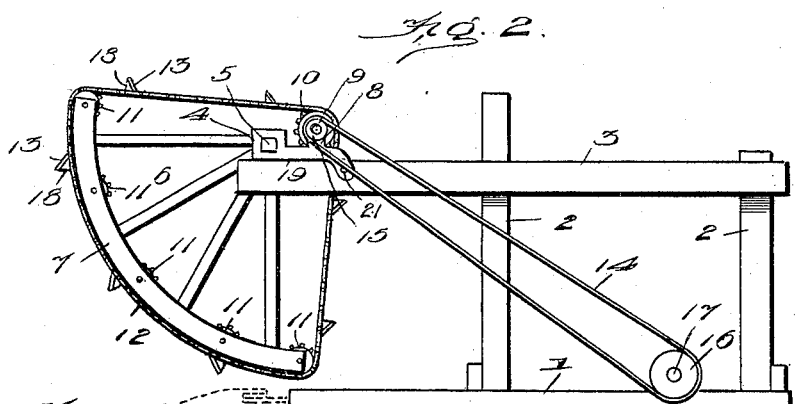
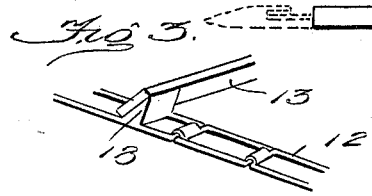
Inventor
James M. Dunahoo,
By Victor J. Evans
Attorney
Witnesses

UNITED STATES PATENT OFFICE.

JAMES M. DUNAHOO, OF HOOD RIVER, OREGON, ASSIGNOR OF ONE-HALF TO ROBERT J. GINN, OF MORO, OREGON.

ENDLESS-CHAIN REEL.

SPECIFICATION forming part of Letters Patent No. 704,445, dated July 8, 1902.

Application filed June 8, 1901. Serial No. 63,746. (No model.)

*To all whom it may concern:*

Be it known that I, JAMES M. DUNAHOO, a citizen of the United States, residing at Hood River, in the county of Wasco and State of Oregon, have invented new and useful Improvements in Endless-Chain Reels, of which the following is a specification.

This invention relates to improvements in endless-chain reels for harvesters, headers, and grain-reaping apparatus generally.

The object of the invention is to provide an endless slatted belt or chain reel which is simple, durable, and effective in construction and operation, occupies much less space, and is much lighter than prior reels of its kind and reels of the old type which described a complete circle, which does not unduly project, so as to be affected by wind-currents, and which is adapted to contact with the grain and move the same toward the cutters in an effective manner and avoids the objection of throwing the grain beyond the platform to the ground, a difficulty experienced with grain-reels of the ordinary type.

With these and other objects in view, which will appear as the nature of the improvements is better understood, the invention consists in certain novel features of construction, combination, and arrangement of parts, as will be hereinafter more fully described, and particularly pointed out in the appended claims.

In the accompanying drawings, Figure 1 represents a top plan view of an endless grain-reel embodying my invention. Fig. 2 is an end elevation of the same. Fig. 3 is a detail view of one of the chain-links, showing the manner of mounting the slats thereon. Fig. 4 is a detail view of one of the pivoted sockets.

Referring to the drawings, the numeral 1 designates a platform of the usual construction, upon the forward edge of which the finger-bar and reciprocating cutter or sickle are mounted. Rising from the ends of this platform are uprights 2, to which are connected two end-supporting bars or arms 3. Pivotally mounted upon and near the forward ends of the bars or arms 3 are brackets 19, the forward ends of which terminate in sockets 4 and the others downwardly-curved and having perforations 20, through which pivot-pins 21 pass in order to secure them to the bars or arms 3. Intermediate the ends of said brackets are bearings 8, which extend above the sockets 4, the object of which will be seen hereinafter. The sockets 4 are provided with rectangular openings 22, adapted to receive the ends of a stationary transverse bar or shaft 5, which rest upon the bars or arms 3 and serve to support the reel. Secured to this shaft at each end and at the center thereof are segments $4^a$, from which radiate arms 6, which have attached to their ends and service-supports a segmental guide bar or piece 7, which extends in the arc of a circle at and projects beyond the front of the platform 1. The arms 6 of each series and the guide-bar 7, connected thereto, form a quadrantal frame and guide for the traveling slatted reel or chain belt. Any number of these frames may be employed. In the present instance I have shown three such frames connected by a common supporting bar or shaft 5, the whole forming the complete supporting-frame of the endless slatted reel. Journaled in the bearings 8, which are in rear of and extending above the said bar or shaft 5 in order to be in the same plane as the ends of the quadrantal frame-pieces and so that the chains carrying the slats will not interfere with the shaft 5, is a transverse shaft 9, carrying sprocket-wheels or pinions 10, corresponding in number to the number of quadrantal frame-pieces employed, and mounted at suitable distances apart on the segmental guide-bar 7 are a number of similar sprocket-wheels or pinions 11. An endless sprocket-chain 12 runs over the sprocket-wheel or pinion 10 of each quadrantal frame-piece and the sprocket-wheels or pinions 11 on said frame-piece, and these chains, three in number, as shown in the present instance, are connected by a series of transverse slats 13, forming therewith the endless-chain reel. This reel is adapted to be set in motion through the medium of suitable gearing. In the present instance I have shown drive-gearing consisting of a belt 14, passed around a pulley 15 on the shaft 9 and a pulley 16 on a shaft 17, journaled upon the frame 1, which shaft 17 is adapted to be driven by suitable connection from the drive mechanism of the harvester.

In order to provide for a peculiar and effective action of the slats 13 upon the grain, I form the links of the chains to which the slats are connected with inclined supporting lugs or projections 18, having upper downwardly and forwardly beveled faces serving as seats for the slats 13. By this construction the slats are set at an oblique angle to the links of the chain, whereby the slats are adapted to pass down edgewise between the standing grain instead of flatwise, as with the ordinary construction, and thus to more effectually force the grain toward the cutter-blades and hold the stalks or stems of the grain at the proper angle to be acted upon by said cutter-blades.

The brackets 19 are hinged or pivoted, as shown, to the bars or arms 3, so that the reel may be thrown upwardly and rearwardly out of the way when it is not desired to use it.

In operation it will be readily understood that when the driving mechanism is set in action the chain-reel will be caused to move over and around its supporting-frame and to force the grain toward the sickle or cutter-bar and push the severed grain rearwardly onto the platform, from which it is deposited upon the draper or endless conveyer in the usual manner.

My improved construction of reel is advantageous in that it occupies much less space and is considerably lighter than the ordinary rotating reel, and hence simplifies the construction of the harvester and decreases the surface on which wind-currents may act to retard the operation of harvesting and scatter the severed grain, and, furthermore, in the fact that it forces the grain toward the cutters in a more effective manner and conveys the severed grain directly back onto the platform, whereby waste due to the throwing of the grain beyond the platform, as frequently happens with reels of ordinary construction, is entirely avoided.

It will of course be understood that pulleys and belts may be substituted for the chains and sprocket-wheels or pinions of the reel and are held to constitute fair equivalents thereof.

Having thus fully described my invention, what I claim as new, and desire to secure by Letters Patent, is—

1. The combination with a support, of brackets pivotally secured to the support, a quadrantal frame rigidly secured to the brackets, a drive-shaft journaled on said brackets, sprocket-chains mounted upon the shaft and frame, acute-angular projections secured to the links of the chains, and slats seated upon the projections whereby they are secured at an acute angle with relation to the chains, and adapted to pass edgewise between the standing stalks of grain.

2. In a reel for harvesters, the combination with a supporting-frame, of a shaft secured to said frame, quadrantal frame members secured to said shaft, sprocket-wheels or pulleys on the curved guide-pieces of the frame members, a drive-shaft carrying coöperating pulleys, and mounted in rear of and above said first-mentioned shaft, belts or sprocket-chains passed around said pulleys or sprocket-wheels, and slats connected to the belts.

3. In a reel for harvesters, the combination with a supporting-frame; of brackets having their rear ends downwardly curved and provided with perforations by means of which said brackets are pivotally secured to said supporting-frame, sockets upon the forward ends of said brackets, bearings upon said brackets in rear of and elevated above said sockets, a bar or shaft rigidly mounted in said sockets, a series of radial arms projecting from said bar or shaft, a curved guide-bar carried by each series of arms and forming therewith a quadrantal frame, said guide-bars being provided with sprockets, a drive-shaft journaled in said bearings, sprockets mounted on said drive-shaft to coöperate with the first-mentioned sprockets, sprocket-chains passed around the sprockets on the guide-bars and drive-shaft, and slats set at an acute angle on said chains.

4. The combination with a supporting-frame; of brackets pivotally secured to said supporting-frame, sockets upon the forward ends of said brackets, bearings upon said brackets in the rear of and elevated above said sockets, a bar or shaft rigidly mounted in said sockets, a frame carried by said bar or shaft, sprockets upon said frame, a drive-shaft journaled in said bearings, sprockets mounted on said drive-shaft to coöperate with the first-mentioned sprocket, sprocket-chains carried by the sprockets, and slats set at an acute angle on said chains.

In testimony whereof I affix my signature in presence of two witnesses.

JAMES M. DUNAHOO.

Witnesses:
 G. W. BOOTH,
 R. E. HOSKINSON.